US011767036B1

(12) United States Patent
Agarwal (10) Patent No.: US 11,767,036 B1
(45) Date of Patent: Sep. 26, 2023

(54) DETERMINING ACCEPTABLE RESPONSES FOR NAVIGATING A VEHICLE THAT ACCOUNTS FOR EXTERNAL CONDITIONS OF THE VEHICLE

(71) Applicant: PlusAI, Inc., Cupertino, CA (US)

(72) Inventor: Ankur Agarwal, San Jose, CA (US)

(73) Assignee: PlusAI, Inc., Cupertino, CA (US)

( * ) Notice: Subject to any disclaimer, the term of this patent is extended or adjusted under 35 U.S.C. 154(b) by 0 days.

(21) Appl. No.: 17/735,823

(22) Filed: May 3, 2022

(51) Int. Cl.
*B60W 60/00* (2020.01)
*B60R 16/023* (2006.01)
*B60W 50/00* (2006.01)
*G06N 20/00* (2019.01)

(52) U.S. Cl.
CPC ..... *B60W 60/0015* (2020.02); *B60R 16/0231* (2013.01); *G06N 20/00* (2019.01); *B60W 2050/0028* (2013.01); *B60W 2300/125* (2013.01); *B60W 2300/145* (2013.01); *B60W 2420/42* (2013.01); *B60W 2420/52* (2013.01); *B60W 2720/10* (2013.01)

(58) Field of Classification Search
CPC ..... B60W 60/0015; B60W 2050/0028; B60W 2300/125; B60W 2300/145; B60W 2420/42; B60W 2420/52; B60W 2720/10; G06N 20/00; B60R 16/0231
See application file for complete search history.

(56) References Cited

U.S. PATENT DOCUMENTS

| 9,665,910 | B2* | 5/2017 | Chalfant | B60W 40/09 |
| 2011/0106334 | A1* | 5/2011 | Filev | B60Q 9/00 |
| | | | | 701/1 |
| 2016/0152233 | A1* | 6/2016 | Fung | B60W 10/04 |
| | | | | 701/41 |
| 2017/0213401 | A1* | 7/2017 | Schaffer | G07C 5/0816 |
| 2018/0354522 | A1* | 12/2018 | Inoue | G08B 25/08 |
| 2019/0244521 | A1* | 8/2019 | Ran | G08G 1/22 |
| 2021/0300428 | A1* | 9/2021 | Stent | G06V 20/597 |

FOREIGN PATENT DOCUMENTS

DE 102020119151 A1 * 1/2022

OTHER PUBLICATIONS

Machine Translation of Liebau's reference (DE 10 2020 119 151 A1) (Year: 2022).*

* cited by examiner

*Primary Examiner* — Tarek Elarabi
(74) *Attorney, Agent, or Firm* — Sheppard Mullin Richter & Hampton LLP

(57) ABSTRACT

Sensor data indicating a substantially 360 degree surrounding of a vehicle is received via a processor included in the vehicle. The sensor data is collected using multiple sensors included in the vehicle. Additionally, an acceptable response time range for a driver of the vehicle to perform an action with the vehicle is obtained, via the processor, based on the sensor data. Additionally, an actual response time for the driver to perform the action is determined, via the processor, based on CAN data collected from a CAN bus included in the vehicle, and not based on the sensor data. Additionally, a determination is made, via the processor, that the actual response time is not within the acceptable response time range. Additionally, a remedial action is caused, via the processor, to be performed in response to the determining that the actual response time is not within the acceptable response time range.

20 Claims, 4 Drawing Sheets

FIG. 4

DETERMINING ACCEPTABLE RESPONSES FOR NAVIGATING A VEHICLE THAT ACCOUNTS FOR EXTERNAL CONDITIONS OF THE VEHICLE

FIELD

One or more embodiments are related to determining one or more acceptable responses for navigating a vehicle that accounts for external conditions of the vehicle.

BACKGROUND

Vehicles and/or drivers of vehicles can be monitored to ensure that desirable behavior is exhibited and/or undesirable behavior is not exhibited. Some known systems use sensor data indicating only a particular surrounding region of a vehicle, such as an area in front of the vehicle (and not, for example, the areas to the back, left, and right of the vehicle). Relying on sensor data indicating only a particular surrounding region, however, can cause an undesirable number of false positive and/or false negative assumptions to be made about vehicle and/or driver behavior. Additionally, some known systems rely solely on sensor data when monitoring behavior, such as images and/or video captured by a camera. Relying solely on such sensor data, however, may be too slow and inefficient for the high-speed, quick react situations that vehicles and/or drivers of the vehicles often encounter while driving. Additionally, some known systems do not sense and/or incorporate how other vehicles are acting and/or how a scenario is evolving when considering if monitored behavior is desirable and/or undesirable.

SUMMARY

In one or more embodiments, an apparatus includes a plurality of sensors, a memory, and a processor operatively coupled to the plurality of sensors and the memory. Sensor data indicating a substantially 360 degree surrounding of a vehicle is received via the processor, the processor included in the vehicle. The sensor data is collected using the plurality of sensors, the plurality of sensors included in the vehicle. Additionally, an acceptable response time range for a driver of the vehicle to perform an action with the vehicle is obtained, via the processor, based on the sensor data. Additionally, an actual response time for the driver to perform the action is determined, via the processor, based on control area network (CAN) data collected from a CAN bus included in the vehicle, and not based on the sensor data. Additionally, a determination is made, via the processor, that the actual response time is not within the acceptable response time range. Additionally, a remedial action is caused, via the processor, to be performed in response to the determining that the actual response time is not within the acceptable response time range.

In one or more embodiments, a non-transitory processor-readable medium stores code representing instructions to be executed by one or more processors. The instructions include code to cause the one or more processors to receive a first set of sensor data indicating a surrounding of a vehicle at a first environment, the one or more processors included in the vehicle. The first set of sensor data is collected using a plurality of sensors included in the vehicle. Additionally, the instructions further include code to cause the one or more processors to determine a first set of acceptable responses for a driver of the vehicle based on the first set of sensor data. Additionally, the instructions further include code to cause the one or more processors to determine a first actual response of the driver based on a first set of control area network (CAN) data collected from a CAN bus included in the vehicle. Additionally, the instructions further include code to cause the one or more processors to determine that the first actual response is not included in the first set of acceptable responses. Additionally, the instructions further include code to cause the one or more processors to cause a remedial action to be performed in response to the determining that the first actual response is not included in the first set of acceptable responses. Additionally, the instructions further include code to cause the one or more processors to receive a second set of sensor data different than the first set of sensor data and indicating a surrounding of the vehicle at a second environment different than the first environment. The second set of sensor data is collected using the plurality of sensors included in the vehicle. Additionally, the instructions further include code to cause the one or more processors to determined a second set of acceptable responses different than the first set of acceptable responses for the driver is determined based on the second set of sensor data. Additionally, the instructions further include code to cause the one or more processors to determine a second actual response of the driver based on a second set of CAN data collected from the CAN bus included in the vehicle. Additionally, the instructions further include code to cause the one or more processors to determine that the second actual response is included in the second set of acceptable responses.

In one or more embodiments, a method includes receiving a first training dataset. The first training dataset can include (1) a first set of sensor data indicating a surrounding of a first vehicle, and (2) a representation of a response of a driver of the first vehicle to perform an action based on a set of control area network (CAN) data collected from a CAN bus included in the first vehicle. Additionally, the method further includes receiving a second training dataset. The second training data can include (1) a second set of sensor data indicating a surrounding of a second vehicle, and (2) a representation of a response of a driver of the second vehicle to perform the action based on a set of CAN data collected from a CAN bus included in the second vehicle. Additionally, the method further includes training an anomaly detection model, using the first training dataset and the second training dataset, to produce a trained anomaly detection model. Additionally, the method further includes receiving (1) a third set of sensor data indicating a surrounding of a third vehicle, and (2) a representation of a response of a driver of the third vehicle to perform the action based on a set of CAN data collected from a CAN bus included in the third vehicle. Additionally, the method further includes determining that the response of the driver of the third vehicle is anomalous using the trained anomaly detection model, the third set of sensor data, and the representation of the response of the driver of the third vehicle. Additionally, the method further includes causing a remedial action to be performed in response to determining that the response of the driver of the third vehicle anomalous.

DETAILED DESCRIPTION

Driver behavior can be monitored based on a surrounding environment of a vehicle, as well as in-vehicle actions performed by a driver of the vehicle. The surrounding environment of the vehicle can be analyzed to determine a set of responses that are acceptable for the driver to perform and/or a set of responses that are not acceptable for the driver to perform given the surrounding environment. Thereafter, the in-vehicle actions of the driver can be inferred using, for example, control area network (CAN) bus data. Thereafter, the in-vehicle actions can be compared to the set of responses that are acceptable for the driver to perform and/or the set of responses that are not acceptable for the driver to perform at the surrounding environment to determine if a remedial action should occur, such as recommending the driver to receive further training or adjusting a mode of operation of the vehicle.

Furthermore, in some implementations, data from a fleet including multiple vehicles can be received and/or analyzed to generate and/or update a software model that can monitor driver behavior for the fleet. In some instances, the software model can identify anomalous driving behavior of one or more drivers associated with the fleet, undesirable driving behaviors for one or more drivers associated with the fleet, one or more drivers associated with the fleet that could use additional training, and/or the like.

In some instances, techniques described herein increase overall safety at roads. Drivers that are exhibiting risky behavior can be identified, and mitigating actions can take place. Increased safety at roads can have multiple advantages, such as reducing risk of traffic accidents and saving lives.

Furthermore, in some implementations, techniques described herein can consider CAN bus data from a vehicle instead of and/or in addition to sensor data. CAN bus data can allow some actions of the vehicle and/or driver to be determined faster than sensor data. As such, the actions of the vehicle and/or driver can be determined and/or compared to the set of responses that are acceptable for the driver to perform and/or the set of responses that are not acceptable for the driver to perform in a faster manner (e.g., ~200-300 milliseconds earlier).

Furthermore, in some instances, the techniques described herein can be applied to heavy vehicles, such as semi trucks. Due to their relatively larger weight and size, heavy vehicles and/or drivers of heavy vehicles exhibiting undesirable behavior can be riskier than, for example, light trucks and/or drivers of light trucks. As such, ensuring that heavy vehicles and/or drivers of heavy vehicles are not exhibiting undesirable behaviors can be particularly desirable (e.g., compared to vehicles that are lighter than heavy vehicles).

Figure 1:
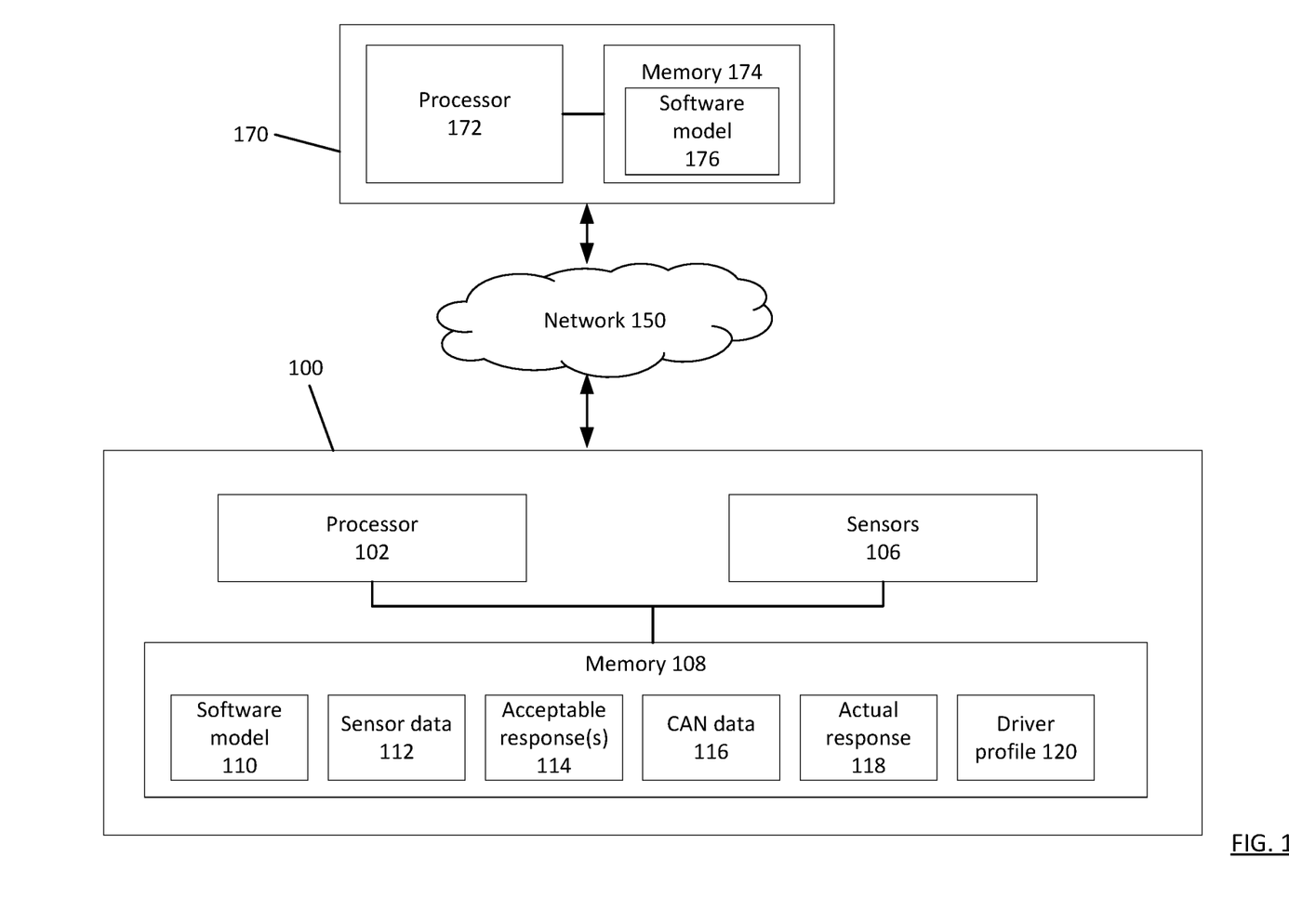
FIG. 1 shows a block diagram of a system for monitoring driver behavior, according to an embodiment

FIG. 1 shows a block diagram of a system for monitoring driver behavior, according to an embodiment. FIG. 1 includes a vehicle 100 operatively coupled to a compute device 170 via a network 150.

The network 150 can be any suitable communications network for transferring data, operating over public and/or private networks. For example, the network 150 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the network 150 can be a wireless network such as, for example, a Wi-Fi or wireless local area network ("WLAN"), a wireless wide area network ("WWAN"), and/or a cellular network. In other instances, the network 150 can be a wired network such as, for example, an Ethernet network, a digital subscription line ("DSL") network, a broadband network, and/or a fiber-optic network. In some instances, the network can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS). The communications sent via the network 150 can be encrypted or unencrypted. In some instances, the communication network 150 can include multiple networks or subnetworks operatively coupled to one another by, for example, network bridges, routers, switches, gateways and/or the like (not shown).

The vehicle 100 includes a processor 102, sensors 106, and memory 108, each operatively coupled to one another (e.g., via a system bus). In some implementations, the processor 102, sensors 106, and/or memory 108 are operatively coupled to one another via a control area network (CAN) bus included in the vehicle 100.

The vehicle 100 can operate in a fully autonomous mode (and not a semi-autonomous or manual mode), a semi-autonomous mode (and not a fully autonomous or manual mode), a manual mode (and not a fully autonomous or semi-autonomous mode), or a combination thereof. In some implementations, the vehicle 100 can be a medium truck, heavy truck, very heavy truck, semi-truck, greater than 14,000 pounds, greater than 26,000 pounds, greater than 70,000 pounds, or greater than 80,000 pounds. In some implementations, the vehicle 100 is a tractor attached to a trailer.

The processor 102 can be, for example, a hardware based integrated circuit (IC) or any other suitable processing device configured to run and/or execute a set of instructions or code. For example, the processor 102 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 102 can be configured to run any of the methods and/or portions of methods discussed herein.

The sensors 106 can include one or more sensors for collecting sensor data (e.g., sensor data 112, discussed below). The sensors 106 can be used to observe and gather any information that could be useful for performing the techniques discussed herein, such as information associated with a surrounding environment of the vehicle 100 (e.g., nearby obstacles and their attributes, lane markers and their attributes, weather, etc.), information associated with the vehicle 100 itself (e.g., speed, acceleration rate, location, lane position, etc.), and/or information about a driver of the vehicle 100 (e.g., posture, facial expression, heart rate, speech, movements, mental state, etc.). The sensors 106 can include, for example, at least one of a camera, a radar, a lidar, a microphone, an inertial measurement unit (IMU), or a gyroscope. In some implementations, the sensors 106 include multiple cameras, multiple radars, and multiple lidars. In some implementations, at least a portion of the sensors 106 are located at the vehicle 100 such that a substantially 360 degree surrounding of a vehicle 100 can be determined using data collected by the sensors 106. In some implementations, a substantially 360 degree surrounding of the vehicle 100 includes a region in front of the vehicle 100, a region to the left of the vehicle 100, a region to the right of the vehicle 100, and a region behind the vehicle 100. In some implementations, a substantially 360 degree surrounding of the vehicle 100 includes at least 300 degrees around the vehicle 100, at least 325 degrees around the vehicle 100, at least 350 degrees, or around the vehicle 100, at least 355 degrees around the vehicle 100, at least 358 degrees around the vehicle 100, at least 359 degrees around the vehicle 100, etc. In some implementations, one or more of the sensors 106 are located at the vehicle 100 such that a facial expression and/or body posture of a driver of the vehicle 100 can be captured. For example, a camera can be located within a cabin of vehicle 100 and positioned to capture a facial expression and/or body posture of a driver of the vehicle 100.

The memory 108 can be, for example, a random-access memory (RAM), a memory buffer, a hard drive, a read-only memory (ROM), an erasable programmable read-only memory (EPROM), and/or the like. In some instances, the memory 108 can store, for example, one or more software programs and/or code that can include instructions to cause the processor 102 to perform one or more processes, functions, and/or the like. In some embodiments, the memory 108 can include extendable storage units that can be added and used incrementally. In some implementations, the memory 108 can be a portable memory (e.g., a flash drive, a portable hard disk, and/or the like) that can be operatively coupled to the processor 102. In some instances, the memory 108 can be remotely operatively coupled with a compute device (not shown); for example, a remote database device can serve as a memory and be operatively coupled to the compute device.

The memory 108 can include (e.g., store) sensor data 112. The sensor data 112 can be collected by the sensors 106. The sensor data 112 can include for example information about the vehicle's 100 surrounding environment, such as attributes (e.g., type, size, speed, position, relative distance, acceleration, etc.) of nearby obstacles (e.g., vehicles, buildings, pedestrians, lane dividers, sidewalks, etc.), attributes (e.g., location and size) of shoulder areas, attributes (e.g., shape and grade) of a road, weather conditions, and/or the like. The sensor data 112 can also include information about the vehicle 100 itself, such as the vehicle's 100 speed, location, tire pressure, internal temperature, audio being played, lights that are on or off, windshield wiper settings, window settings, tractor and trailer state, and/or the like; additionally or alternatively, such information about the vehicle 100 itself can be indicated by the CAN data 116, as will be discussed below. The sensor data 112 can also include information about a driver of the vehicle 100, such as the driver's posture, facial expression, heart rate, speech, movements, mental state, and/or the like. If the vehicle 100 is a tractor and trailer, sensor data 112 about the tractor and trailer state can include for example information about the tractor and trailer, such as if and/or to what extent the trailer is swaying.

The memory 108 also includes (e.g., stores) a representation of an acceptable response(s) 114 for a driver of the vehicle 100. Based on a driving situation, as can be determined using the sensor data 112, the vehicle 100 and/or driver of the vehicle 100 can have some actions that can be acceptable (e.g., safe, desirable, not dangerous, etc.) to take given the driving situation, while having some other actions that may not be acceptable (e.g., not safe, not desirable, dangerous, etc.) to take given the driving situation. The acceptable response(s) 114 can indicate for example one or more (e.g., at least two) responses that are acceptable for the vehicle 100 and/or a driver of the vehicle 100 to take given a driving scenario (as indicated by or consistent with the sensor data 112). The acceptable response(s) 114 can include representations of, for example, an action (e.g., decelerating, accelerating, turning, turning off the radio, closing a window, turning headlights on, turning windshield wipers on, etc.), a sequence of actions (e.g., turn on blinker before changing lanes), a time range within which an action should be performed, a time range within which an action should be refrained from being performed, a time range within which a state should be maintained, a distance range relative to an obstacle (e.g., nearby vehicle) where an action should be performed, a distance range relative to an obstacle where an action should be refrained from being performed, a distance range relative to an obstacle that should be maintained, a combination thereof, and/or the like, such as slowing down to less than a predetermined speed limit, speeding up to greater than a predetermined speed limit, switching lanes, changing a mode of operation of the vehicle 100, maintaining a mode of operation of the vehicle 100, maintaining a speed, maintaining a distance, perform a driving maneuver, refraining from performing a driving maneuver, a combination thereof, and/or the like.

Optionally, the acceptable response(s) 114 can indicate an acceptable state of a driver of the vehicle 100 at a given environment. For example, if the surrounding environment includes many obstacles, the acceptable response(s) 114 may indicate that the driver should be more alert in contrast to a scenario where the surrounding environment includes less obstacles. Examples of acceptable states can include being alert, not angry, not drowsy, not distracted, etc. (as indicated by and/or inferred from sensor data that captured a facial expression and/or body posture of a driver). Additional information related to detecting, analyzing, and/or using driver state information can be found at U.S. Pat. No. 11,130,497, the content of which is incorporated by reference in its entirety herein.

The memory also includes (e.g., stores) a representation of CAN data 116. The vehicle 100 can include a plurality of electronic control units (ECUs), such as an engine control module (ECM), a powertrain control module (PCM), a transmission control module (TCM), a brake control module (BCM), a central control module (CCM), a central timing module (CTM), a general electronic module (GEM), a body control module (BCM), a suspension control module (SCM), and/or the like. The CAN data 116 can include for example representations of communications between the plurality of ECUs. In some implementations, the CAN data 116 can include for example information about a state of the vehicle 100, such as the vehicle's 100 speed, location, tire pressure, internal temperature, audio being played, lights that are on, windshield wiper setting, window settings, tractor and trailer state, and/or the like. Additionally, the CAN data 116 can include information of a change of state of the vehicle 100, such as a change in the vehicle's 100 speed, a change in the vehicle's 100 location, a change in the vehicle's 100 tire pressure, a change in the vehicle's 100 internal temperature, a change in audio being played by the vehicle 100, a change in light settings of the vehicle 100, a change in windshield wiper settings of the vehicle 100, a change in window settings of the vehicle 100, a change in tractor and trailer state of the vehicle 100, and/or the like.

The memory 108 also includes (e.g., stores) a representation of for example an actual response 118 of the vehicle 100, a different vehicle (not shown in FIG. 1), a driver of the vehicle 100, and/or a driver of the different vehicle at the same scenario/environment for which the acceptable response(s) 114 was determined and/or a substantially same scenario/environment (e.g., sensor data of both scenarios/environments are at least 50% similar, at least 75% similar, at least 85% similar, at least 95% similar, at least 98% similar, at least 99% similar, etc.) for which the acceptable response(s) 114 was determined. The actual response 118 can be an actual response(s) at a time that is at substantially (e.g., within 0.1 seconds of, within 0.5 second of, within 1 second of, within 2 seconds of, within 5 seconds of, etc.) the same time that the acceptable response(s) 114 was determined, a time that is after the acceptable response(s) 114 was determined (e.g., 2 days later, 2 weeks later, 2 months later, etc.), and/or at time that is before the acceptable response(s) 114 is determined. The actual response 118 can be determined based on the CAN data 116 and sensor data 112. Additionally or alternatively, the actual response 118 can be determined based on the CAN data 116, but not the sensor data 112. The actual response 118 can indicate, for example, an action, a sequence of actions, time an action was performed, time an action was refrained from being performed, time a state was maintained, a distance relative to an obstacle when an action was performed, a distance relative to an obstacle when an action was refrained from being performed, a distance relative to an obstacle that was maintained, and/or the like, such as slowing down to less than a predetermined speed limit, speeding up to greater than a predetermined speed limit, switching lanes, changing a mode of operation of the vehicle 100, maintaining a mode of operation of the vehicle 100, maintaining a speed, maintaining a distance, perform a driving maneuver, refrain from performing a driving maneuver, and/or the like.

Optionally, the actual response 118 can indicate a state of a driver of the vehicle 100 and/or a driver of another vehicle different that vehicle 100 at a given environment. In some implementations, sensors 106 located inside the vehicle can capture data on the driver to determine the driver's state. For example, the actual response 118 can be that the driver is alert, not angry, not drowsy, not distracted, etc.

The memory 108 also includes (e.g., stores) a representation of a driver profile 120. The driver profile 120 can include information associated with the driver of the vehicle 100, such the driver's habits, height, weight, average heart rate, age, vision, health concerns, driving record, years of overall driving experience, years of commercial motor vehicle driving experience, and/or the like. In some implementations, the driver profile 120 can be used, at least partially, to determine the acceptable response(s) 114. For example, if a driver of the vehicle 100 is an elderly person with a poor reaction time, the vehicle 100 may need to start decelerating at a distance from an obstacle that would be less if the driver has better vision. As another example, if a driver of the vehicle 100 has less than a week of driving experience, the vehicle 100 may need to maintain a distance relative to another vehicle when changing lanes that would be less if the driver had more driving experience.

The memory 108 also includes (e.g., stores) a software model 110. The software model 110 can be, for example, an artificial intelligence (AI) model, a machine learning (ML) model, an analytical model, a mathematical model or any combination thereof. The software model 110 can be used (e.g., by processor 102) to determine the acceptable response(s) 114 for a driver of the vehicle 100 based on the sensor data 112 and/or driver profile 120. For example, the sensor data 112 can indicate that the vehicle 100 is surrounded by many obstacles, in which case the acceptable response(s) 114 is stricter relative to a scenario where less obstacles are present. As another example, the sensor data 112 can indicate that the vehicle 100 is not surrounded by many obstacles, in which case the acceptable response(s) 114 is less strict relative to a scenario where more obstacles are present. In some implementations, the acceptable response(s) 114 is more strict as the surrounding environment is more risky/dangerous (e.g., more obstacles, narrower roads, curvier roads, slippery roads, etc.).

The software model 110 can also be used to analyze the CAN data 116 (and optionally, the sensor data 112) to determine the actual response 118 of the driver of the vehicle 100. For example, the CAN data 116 be analyzed to determine when and/or to what extent the brake pad has been pushed, indicating that the driver of the vehicle 100 has started decelerating. As another example, the CAN data 116 can be analyzed to determine when, to what direction, and/or to what extent a steering wheel of the vehicle 100 has rotated, indicating that the driver of the vehicle 100 is performing a driver maneuver to change the direction of the vehicle.

The software model 110 can also be used to compare the acceptable response(s) 114 to the actual response 118 and determine if a remedial action should occur. In some implementations, the software model 110 can determine that a remedial action should occur if the actual response 118 is different than and/or substantially different (e.g., more than 5% different, more than 10% different, more than 20% different, more than 33% different, more than 50% different, etc.) than the acceptable response(s) 114. For example, for given situation, the acceptable response(s) 114 may be for a driver of the vehicle 100 to begin decelerating the vehicle 100 within 125 to 175 feet from a different vehicle in front of vehicle 100; if the actual response 118 is that the driver of the vehicle 100 has begun decelerating the vehicle at a distance less than 125 feet or greater than 175 feet from the other vehicle in front of vehicle 100, the software model 110 can determine that a remedial action should occur.

In some implementations, the remedial action is to change a mode of operation of the vehicle 100. For example, if the vehicle 100 is operating in a manual mode, the remedial action can be to change the vehicle 100 to operate in a semi-autonomous or fully-autonomous mode (e.g., if the driver is having a health-related event such as a heart attack). As another example, if the vehicle 100 is operating in two-wheel drive, the remedial action can be to change the vehicle 100 to operate in four-wheel drive. As another example, if the vehicle 100 is operating with the radio on, the remedial action can be to turn the radio off or decrease a volume of the radio (e.g., to help the driver concentrate more in a risky/dangerous situation). As another example, if the vehicle 100 is operating in an eco-mode (e.g., sacrifice some power and/or responsiveness of the vehicle 100 to get better fuel economy), the remedial action can be to change the vehicle 100 to operate in a sports mode (e.g., don't sacrifice some power and/or responsiveness of the vehicle 100 to get better fuel economy).

In some implementations, the remedial action is to send an alert to the driver of the vehicle 100. For example, the alert could indicate an action(s) that the driver should take (e.g., drive less aggressively, rest, decelerate less abruptly, begin braking earlier, etc.), that the driver did not perform an acceptable response, and/or the like. The alert could be delivered audibly, visually, and/or the like.

In some implementations, the remedial action is to indicate the driver's failure to perform the acceptable response(s) 114 at the driver profile 120. If, for example, the driver has failed to perform an acceptable response more than a predetermined number of times, the driver profile 120 may be updated to indicate that the driver should take additional training.

Note that, although vehicle 100 was discussed with respect to acceptable response(s) 114 and whether or not the actual response 118 was acceptable, additionally or alternatively, unacceptable responses can be determined based on the sensor data 112. If, for example, the actual response 118 is an unacceptable response, a remedial action can occur.

The compute device 170 includes a processor 172 operatively coupled to a memory 174 (e.g., via a system bus). Although not shown in FIG. 1, the compute device 170 can be coupled to one or more other vehicles in addition to vehicle 100 (also referred to herein as a "fleet"). The compute device 170 can be remote from the fleet, allowing data to be received from and sent to multiple different vehicles within the fleet.

The processor 172 can be, for example, a hardware based integrated circuit (IC) or any other suitable processing device configured to run and/or execute a set of instructions or code. For example, the processor 172 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 172 can be configured to run any of the methods and/or portions of methods discussed herein.

The memory 174 can be, for example, a random-access memory (RAM), a memory buffer, a hard drive, a read-only memory (ROM), an erasable programmable read-only memory (EPROM), and/or the like. In some instances, the memory 174 can store, for example, one or more software programs and/or code that can include instructions to cause the processor 172 to perform one or more processes, functions, and/or the like. In some embodiments, the memory 174 can include extendable storage units that can be added and used incrementally. In some implementations, the memory 174 can be a portable memory (e.g., a flash drive, a portable hard disk, and/or the like) that can be operatively coupled to the processor 172. In some instances, the memory 174 can be remotely operatively coupled with a compute device (not shown); for example, a remote database device can serve as a memory and be operatively coupled to the compute device.

The memory 174 can also include a software model 176. The software model 176 can be, for example, an artificial intelligence (AI) model, a machine learning (ML) model, an analytical model, a mathematical model, or a combination thereof. As the compute device 170 receives data (e.g., sensor data 112, acceptable response(s) 114, actual response 118, driver profile 120) from a fleet of vehicles, including vehicle 100, the software model 176 can analyze the data to identify unwanted responses, abnormal responses, drivers that can benefit from additional training, driving characteristics of the fleet, and/or the like. Additionally, upon analysis of the data, the compute device 170 can send signals to one or more vehicles in the fleet and/or other compute devices not shown in FIG. 1 including a software update, a presentation of an indication that a driver is behaving atypical compared to other drivers, an indication that a driver needs additional training, and/or the like. In some implementations, the software model 176 is an anomaly detection model trained to identify responses of drivers that are anomalous. In some implementations, the software model 176 is used for example as an assessment and/or standardized testing tool to driver training purposes, such as determining if a driver behaves acceptably and/or not anomalously.

In an example scenario with reference to FIG. 1, vehicle 100 is travelling on a road. The sensors 106 collect sensor data 112 that indicates that the vehicle 100 is surrounded by other vehicles. The driver profile 120 indicates that the driver is fairly novice. Based on the sensor data 112 and/or driver profile 120, the software model 110 determines that the vehicle 100 should not drive greater than 15 miles per an hour over the speed limit. The CAN data 116 can indicate the speed of the vehicle 100. The software model 110 can use the CAN data 116, and not the sensor data 112, to determine the actual speed of the vehicle (e.g., actual response 118). If the actual response 118 indicates that vehicle 100 travelled greater than 15 miles per an hour over the speed limit, a remedial action can occur.

In another example scenario with reference to FIG. 1, vehicle 100 is travelling on a road. The sensors 106 collect sensor data 112 that indicates that the vehicle 100 is surrounded by other vehicles. The driver profile 120 indicates that the driver is somewhat experienced. Based on the sensor data 112 and/or driver profile 120, the software model 110 determines that the vehicle 100 should never decelerate at a rate greater than 100 feet per second squared. The CAN data 116 can indicate if and to what extent the vehicle's 100 brake pad has been pressed. The software model 110 can use the CAN data 116, and not the sensor data 112, to determine the deceleration rate of the vehicle (e.g., actual response 118). If the actual response 118 indicates that that vehicle 100 decelerated at a rate greater than 100 feet per second squared, a remedial action can occur.

In another example scenario with reference to FIG. 1, vehicle 100 is travelling in a road. The sensors 106 collect sensor data 112 that indicates that the vehicle 100 is located in front of a second vehicle, and in a lane directly to the left of the second vehicle. Based on the sensor data 112 and/or driver profile 120, the software model 110 determines that the vehicle 100 should maintain a distance greater than 20 feet when changing into the same lane as the second vehicle (e.g., acceptable response(s) 114). The CAN data 116 can indicate when and to what extent the steering wheel has turned right, as well as when the steering wheel recentered after being turned right. The software model 110 can determine a distance between the vehicle 100 and the second vehicle as the vehicle 100 changes into the same lane as the second vehicle (e.g., actual response 118) using (1) the CAN data 116 to determine that the vehicle 100 is changing lanes, and (2) the sensor data 112 to determine a distance between the vehicle 100 and the second vehicle. If the actual response 118 indicates that that vehicle 100 changed lanes without maintaining a distance greater than 20 feet, a remedial action can occur.

In another example scenario with reference to FIG. 1, the vehicle 100 includes a tractor and trailer. The sensors 106 collect sensor data 112 that indicates that the trailer of the vehicle 100 is fishtailing. The software model 110 determines that the vehicle 100 should decelerate quickly and perform a sharp turn to the right (e.g., acceptable response(s) 114). The CAN data 116 can indicate if and to what extent the vehicle's 100 brake pad has been pressed, as well as if and to what extent the vehicle's 100 steering wheel has been turned to the right. The software model 110 can use the CAN data 116, and not the sensor data 112, to determine if the vehicle 100 decelerated quickly and performed a sharp turn to the right (e.g., actual response 118). If the actual response 118 indicates that that vehicle 100 decelerated quickly and performed a sharp turn to the right, a remedial action is not caused to occur.

Figure 2:
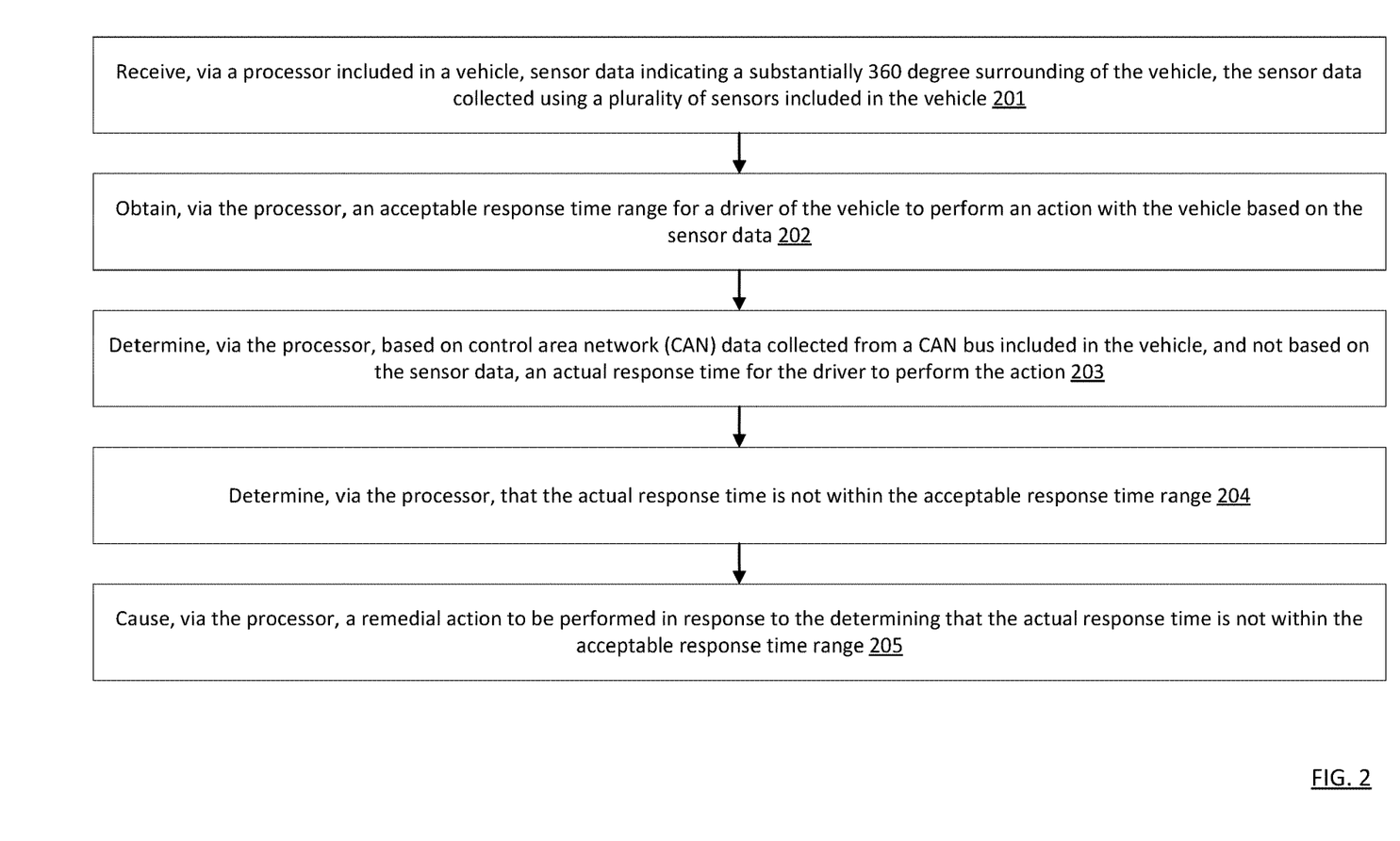
FIG. 2 shows a flowchart of a method for causing a remedial action to be performed in response to determining that an actual response time is not within an acceptable response time range for a given scenario, according to an embodiment.

FIG. 2 shows a flowchart of a method 200 for causing a remedial action to be performed in response to determining that an actual response time is not within an acceptable response time range for a given scenario, according to an embodiment. In some implementations, method 200 can be performed by processor 102 of the vehicle 100.

At 201, sensor data (e.g., sensor data 112) indicating a substantially 360 degree surrounding of a vehicle (e.g., vehicle 100) is received via a processor (e.g., processor 102) included in the vehicle. The sensor data is collected using a plurality of sensors (e.g., sensors 106) included in the vehicle. The sensor data can indicate the substantially 360 degree surrounding of the vehicle at a given time, or across a range of time. In some implementations, a first subset of sensor data associated with a first region of the 360 degree surrounding is captured using a first sensor from the plurality of sensors being a first type, and a second subset of sensor data associated with a second region of the 360 degree surrounding different than the first region is captured using a second sensor from the plurality of sensors being a second type different than the first type. For example, sensor data indicating a front and back region of the vehicle can be collected using a camera, and sensor data indicating a left and right region of the vehicle can be collected using a radar.

At 202, an acceptable response time range (e.g., acceptable response(s) 114) for a driver of the vehicle to perform an action with the vehicle is obtained, via the processor, based on the sensor data. In some implementations, the acceptable response time range can be determined using software model (e.g., software model 110). The action could be, for example, a driving maneuver, a sequence of driving maneuvers, changing a setting of the vehicle, etc. In some implementations, 202 is performed automatically (e.g., without requiring input from a human) in response to completing 201.

At 203, an actual response time (e.g., actual response 118) for the driver to perform the action is determined, via the processor, based on control area network (CAN) data (e.g., CAN data 116) collected from a CAN bus included in the vehicle, and not based on the sensor data. In some implementations, the actual response time can be determined using software model (e.g., software model 110). In some implementations, 203 is performed automatically (e.g., without requiring input from a human) in response to completing 202.

At 204, a determination is made, via the processor, that the actual response time is not within the acceptable response time range. In some implementations, the determination can be made using software model (e.g., software model 110). In some implementations, 204 is performed automatically (e.g., without requiring input from a human) in response to completing 203.

At 205, a remedial action is caused, via the processor, to be performed in response to the determining that the actual response time is not within the acceptable response time range. In some implementations, the remedial action is caused by the processor sending a signal(s) to the vehicle and/or a different compute device (e.g., compute device 170), where the vehicle and/or different compute device is configured to perform the remedial action in response to receiving the signal(s). In some implementations, 205 is performed automatically (e.g., without requiring input from a human) in response to completing 204.

In some implementations of method 200, the acceptable response time range for the driver to perform the remedial action is further based on a driver profile (e.g., driver profile 120) associated with the driver.

In some implementations of method 200, the vehicle is a tractor attached to a trailer. In some implementations of method 200, the acceptable response time range for the driver to perform the remedial action is further based on a state of the tractor and the trailer.

In some implementations of method 200, the vehicle is a semi-autonomous heavy truck. For example, the vehicle may operate at one or more of level two autonomy, level three autonomy, or level four autonomy.

In some implementations of method 200, the remedial action is to decrease a speed of the vehicle to less than a predetermined speed threshold (e.g., speed limit associated with the vehicle's location, at least 5% less than the speed limit associated with the vehicle's location, at least 10% less than the speed limit associated with the vehicle's location, at least 25% less than the speed limit associated with the vehicle's location, 20 miles per hour, 15 miles per hour, 10 miles per hour, 5 miles per hour, 1 mile per hour, etc.),. In some implementations of method 200, the remedial action is to change a mode of operation of the vehicle. In some implementations of method 200, the remedial action is to recommend that the driver receive additional driver training.

Some implementations of method 200 further include causing state data of the driver to be collected, via the processor, in response to the determining that the actual response time is not within the acceptable response time range at 204. State data could be collected by at least one sensor from the plurality of sensors. The state data could indicate a state of the driver, such as the driver's mental state (e.g., angry, drowsy, etc.) or physical state (e.g., slouched, looking downwards, etc.). Some implementations of method 200 further include updating, via the processor, a driver profile associated with the driver based on the state data of the driver.

In some implementations of method 200, the plurality of sensors includes a camera, a radar, and a lidar. In some implementations of method 200, the plurality of sensors includes a plurality of cameras, a plurality of radars, and a plurality of lidars. In some implementations, the plurality of sensors includes only cameras, only radars, and/or only lidars.

Figure 3:
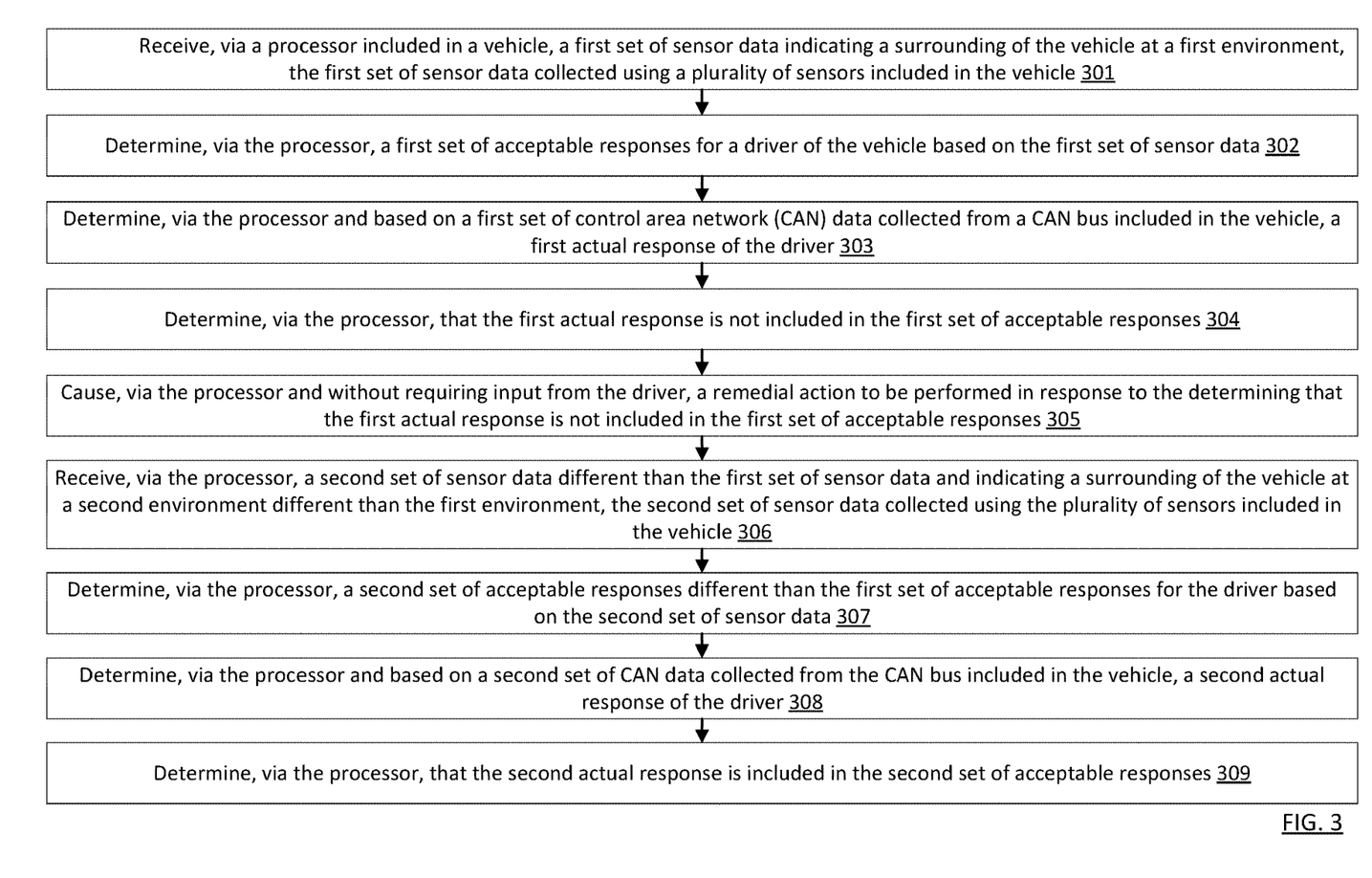
FIG. 3 shows a flowchart of a method for comparing, at each environment from multiple different environments, an acceptable response and actual response for that environment, according to an embodiment.

FIG. 3 shows a flowchart of a method 300 for comparing an acceptable response and actual response at each environment from a set of environments, according to an embodiment. In some implementations, method 300 can be performed by processor 102 of the vehicle 100.

At 301, a first set of sensor data (e.g., sensor data 112) indicating a surrounding of a vehicle (e.g., vehicle 100) at a first environment is received via a processor (e.g., processor 102) included in the vehicle. The first set of sensor data is collected using a plurality of sensors (e.g., sensors 106) included in the vehicle.

At 302, a first set of acceptable responses (e.g., acceptable response(s) 114) for a driver of the vehicle is determined, via the processor, based on the first set of sensor data. The first set of acceptable responses can include one or more acceptable responses (e.g., at least one, at least two, etc.). In some implementations, the first set of acceptable responses can be determined using software model (e.g., software model 110). In some implementations, 302 is performed automatically (e.g., without requiring input from a human) in response to completing 301.

At 303, a first actual response (e.g., actual response 118) of the driver is determined, via the processor, based on a first set of control area network (CAN) data (e.g., CAN data 116) collected from a CAN bus included in the vehicle. In some implementations, the first actual response is further determined based on sensor data (e.g., sensor data 112). In some implementations, the first actual response is not determined based on sensor data (e.g., sensor data 112). In some implementations, the first actual response can be determined using software model (e.g., software model 110). In some implementations, 303 is performed automatically (e.g., without requiring input from a human) in response to completing 302.

At 304, a determination is made, via the processor, that the first actual response is not included in the first set of acceptable responses. In some implementations, the determination is made that the first actual response is not included in the first set of acceptable responses using software model 110. In some implementations, 304 is performed automatically (e.g., without requiring input from a human) in response to completing 303.

At 305, a remedial action is caused, via the processor, to be performed in response to the determining that the first actual response is not included in the first set of acceptable responses. In some implementations, the remedial action is caused by the processor sending a signal(s) to the vehicle and/or a different compute device (e.g., compute device 170), where the vehicle and/or different compute device is configured to perform the remedial action in response to receiving the signal(s). In some implementations, 305 is performed automatically (e.g., without requiring input from a human) in response to completing 304.

At 306, a second set of sensor data different than the first set of sensor data and indicating a surrounding of the vehicle at a second environment different than the first environment is received via the processor. The second set of sensor data is collected using the plurality of sensors included in the vehicle. The second environment may differ from the first environment based one or more attributes, such as location of obstacles, size of obstacles, speed of obstacles, weather conditions, location, and/or the like.

At 307, a second set of acceptable responses different than the first set of acceptable responses for the driver is determined, via the processor, based on the second set of sensor data. In some implementations, the second set of acceptable responses can be determined using software model (e.g., software model 110). In some implementations, 307 is performed automatically (e.g., without requiring input from a human) in response to completing 306.

At 308, a second actual response of the driver is determined, via the processor, based on a second set of CAN data collected from the CAN bus included in the vehicle. In some implementations, the second actual response of the driver is determined using software model (e.g., software model 110). In some implementations, 308 is performed automatically (e.g., without requiring input from a human) in response to completing 307.

At 309, a determination is made, via the processor, that the second actual response is included in the second set of acceptable responses. In some implementations, the determination is made that the second actual response is included in the second set of acceptable responses using software model (e.g., software model 110). In some implementations, 309 is performed automatically (e.g., without requiring input from a human) in response to completing 308.

In some implementations of method 300, the vehicle is a tractor attached to a trailer. In some implementations of method 300, the first set of sensor data is collected at a first time, and the first set of acceptable responses are further based on a first state of the tractor and the trailer at the first time. In some implementations of method 300, the second set of sensor data is collected at a second time, and the second set of acceptable responses are further based on a second state of the tractor and the trailer at the second time.

Some implementations of method 300 further include causing, via the processor, a machine learning model (e.g., software model 176) included in a compute device (e.g., compute device 170) remote from the processor to be trained based on at least one of the representation of the first set of sensor data, the first actual response, the second set of sensor data, or the second actual response.

Some implementations of method 300 further include receiving, via the processor, a third set of sensor data different than the first set of sensor data and the second set of sensor data. The third set of sensor data can indicate a surrounding of the vehicle at a third environment. The third set of sensor data can be collected using the plurality of sensors included in the vehicle. Some implementations of method 300 can further include determining, via the processor, a third set of acceptable responses for the driver based on the third set of sensor data. Some implementations of method 300 can further include determining, via the processor, a third actual response of the driver based on a third set of CAN data collected from the CAN bus included in the vehicle. Some implementations of method 300 further include receiving, via the processor, a fourth set of sensor data different than the first set of sensor data, the second set of sensor data, and the third set of sensor data. The further set of sensor data can indicate a surrounding of the vehicle at a fourth environment. The fourth set of sensor data can be collected using the plurality of sensors included in the vehicle. Some implementations of method 300 further include determining, via the processor, a fourth set of acceptable responses for the driver based on the fourth set of sensor data. Some implementations of method 300 further include determining, via the processor, a fourth actual response of the driver based on a fourth set of CAN data collected from the CAN bus included in the vehicle. Note that, while four sets of sensor data and four sets of acceptable responses are discussed, it should be understood that there can be more than four in the course of a driver driving a vehicle.

In some implementations of method 300, the plurality of sensors includes a camera, a radar, and a lidar. In some implementations of method 300, the plurality of sensors includes a plurality of cameras, a plurality of radars, and a plurality of lidars. In some implementations of method 300, the plurality of sensors includes only cameras, only radars, and/or only lidars. In some implementations, any combination of cameras, radars, and/or lidars can be used (e.g., two cameras and one lidar, two lidars and eight cameras, etc.)

In some implementations of method 300, the first environment includes a first number of obstacles within a predetermined radius of the vehicle (e.g., within 1 meter, within 5 meters, within 10 meters, within 20 meters, etc.), the first set of acceptable responses includes a first acceptable reaction time limit, the second environment includes a second number of obstacles within the predetermined radius of the vehicle, the second number is less than the first number, the second set of acceptable responses is a second acceptable reaction time limit, and the second acceptable reaction time limit is greater than the first acceptable reaction time limit.

Figure 4:
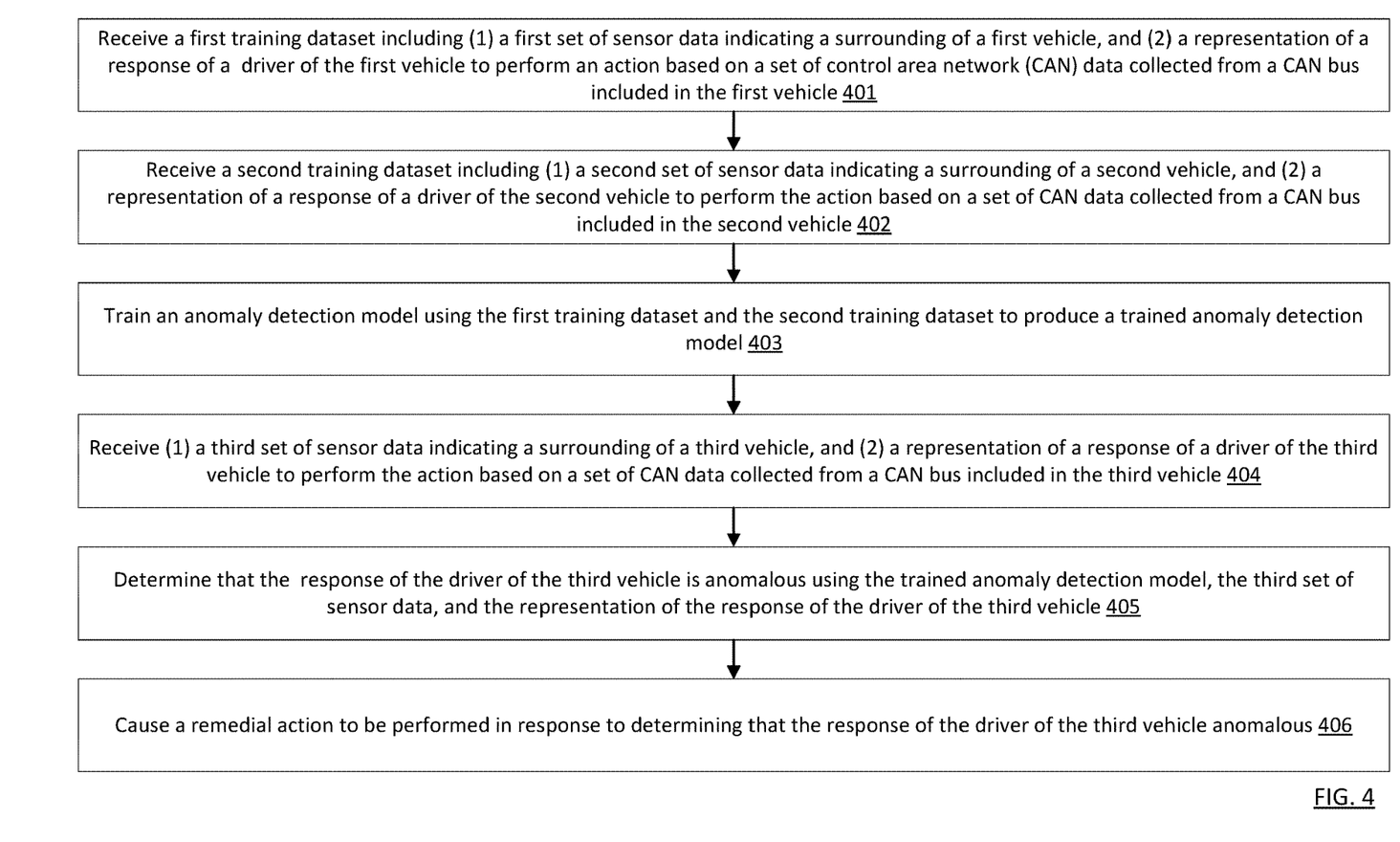
FIG. 4 shows a flowchart of a method for determining that a response of a driver is anomalous, according to an embodiment.

FIG. 4 shows a flowchart of a method 400 for determining that a response of a driver is anomalous, according to an embodiment. In some implementations, method 400 can be performed by the processor 172 of compute device 170.

At 401, a first training dataset is received. The first training dataset can include (1) a first set of sensor data (e.g., sensor data 112) indicating a surrounding of a first vehicle (e.g., vehicle 100), and (2) a representation of a response (e.g., actual response 118) of a driver of the first vehicle to perform an action based on a set of control area network (CAN) data (e.g., CAN data 116) collected from a CAN bus included in the first vehicle.

At 402, a second training dataset is received. The second training data can include (1) a second set of sensor data indicating a surrounding of a second vehicle, and (2) a representation of a response of a driver of the second vehicle to perform the action based on a set of CAN data collected from a CAN bus included in the second vehicle. In some implementations, the second vehicle is different than the first vehicle. In some implementations, the second vehicle is the same as the first vehicle. In some implementations, the surrounding of the first vehicle is different than the surrounding of the second vehicle. In some implementations, the surrounding of the first vehicle is the same as the surrounding of the second vehicle. In some implementations, 402 can be performed prior to 401. In some implementations, 402 and 401 are performed in parallel.

At 403, an anomaly detection model is trained, using the first training dataset and the second training dataset, to produce a trained anomaly detection model (e.g., software model 176). In some implementations, the anomaly detection model is trained to identify responses that are atypical/not baseline/abnormal for a given surrounding. The anomaly detection model can be trained using semi-supervised learning or unsupervised learning. In some implementations, training the anomaly detection model using the CAN data from the first training dataset and the CAN data from the second training dataset produces better predictions/identifications of anomalous behavior (e.g., faster, more accurate, more comprehensive, etc.) than would be the case for the anomaly detection model being trained with just the first set of sensor data and the second set of sensor data.

At 404, (1) a third set of sensor data indicating a surrounding of a third vehicle, and (2) a representation of a response of a driver of the third vehicle to perform the action based on a set of CAN data collected from a CAN bus included in the third vehicle are received. In some implementations, the third vehicle is different than the first vehicle and/or the second vehicle. In some implementations, the third vehicle is the same as the first vehicle and/or the second vehicle. In some implementations, the surrounding of the third vehicle is different than the surrounding of the first vehicle and/or the surrounding of the second vehicle. In some implementations, the surrounding of the third vehicle is the same as the surrounding of the first vehicle and/or the surrounding of the second vehicle.

At 405, a determination is made that the response of the driver of the third vehicle is anomalous using the trained anomaly detection model, the third set of sensor data, and the representation of the response of the driver of the third vehicle. In some implementations, 405 is performed automatically (e.g., without requiring input from a human) in response to completing 404.

At 406, a remedial action is caused to be performed in response to determining that the response of the driver of the third vehicle anomalous. In some implementations, the remedial action is caused by the processor sending a signal(s) to the third vehicle and/or a different compute device, where the third vehicle and/or different compute device is configured to perform the remedial action in response to receiving the signal(s). In some implementations, 406 is performed automatically (e.g., without requiring input from a human) in response to completing 405.

In some implementations of method 400, the first vehicle is a first semi-truck, the second vehicle is a second semi-truck, and the third vehicle is a third semi-truck.

Some implementations of method 400 further include updating the trained anomaly detection model using the third set of sensor data and the representation of the response of the driver of the third vehicle to generate an updated trained anomaly detection model. Some implementations of method 400 further include receiving (1) a fourth set of sensor data indicating a surrounding of a fourth vehicle, and (2) a representation of a response of a driver of the fourth vehicle to perform the action based on a set of CAN data collected from a CAN bus included in the fourth vehicle. Some implementations of method 400 further include inputting the fourth set of sensor data and the representation of the response of the driver of the fourth vehicle to the updated trained anomaly detection model.

Some implementations of method 400 further include receiving (1) a fourth set of sensor data indicating a surrounding of a fourth vehicle, and (2) a representation of a response of a driver of the fourth vehicle to perform the action based on a set of CAN data collected from a CAN bus included in the fourth vehicle. Some implementations of method 400 further include determining that the fourth response is not anomalous using the trained anomaly detection model, the fourth set of sensor data, and the representation of the response of the driver of the fourth vehicle. Some implementations of method 400 further include refraining from causing a remedial action to be performed in response to determining that the response of the driver of the fourth vehicle is not anomalous.

It should be understood that the disclosed embodiments are not intended to be exhaustive, and functional, logical, operational, organizational, structural and/or topological modifications may be made without departing from the scope of the disclosure. As such, all examples and/or embodiments are deemed to be non-limiting throughout this disclosure.

All definitions, as defined and used herein, should be understood to control over dictionary definitions, definitions in documents incorporated by reference, and/or ordinary meanings of the defined terms.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. An apparatus, comprising:
   a processor; and
   a memory operatively coupled to the processor, the memory storing instructions to cause the apparatus to perform operations comprising:
   receiving sensor data for a surrounding environment outside a vehicle, the sensor data collected by a plurality of sensors;
   determining an action for a driver of the vehicle to perform, responsive to the surrounding environment, based on the sensor data;
   determining a response time range for the driver to perform the action based on a number of obstacles in the surrounding environment, wherein the response time range for the driver to perform the action increases based on a decrease in the number of obstacles in the surrounding environment or decreases based on an increase in the number of obstacles in the surrounding environment; in the surrounding environment;
   determining, based on control area network (CAN) data collected from the vehicle, performance of the action and an actual response time associated with the performance of the action;
   determining that the actual response time is not within the response time range for the driver to perform the action; and
   causing a remedial action to be performed in response to determining that the actual response time is not within the response time range for the driver to perform the action.

2. The apparatus of claim 1, wherein the response time range for the driver to perform the action is based on a driver profile associated with the driver.

3. The apparatus of claim 1, wherein the response time range for the driver to perform the action is based on a state of the vehicle.

4. The apparatus of claim 1, wherein the action for the driver of the vehicle to perform and the response time range for the driver to perform the action are based on a scenario indicated by the sensor data.

5. The apparatus of claim 1, wherein the action for the driver of the vehicle to perform includes at least one of: decelerate the vehicle, accelerate the vehicle, turning the vehicle, turning off a radio of the vehicle, closing a window of the vehicle, turning on headlights of the vehicle, and turning on windshield wipers of the vehicle.

6. The apparatus of claim 1, wherein the remedial action is to change a mode of operation of the vehicle.

7. The apparatus of claim 1, wherein the remedial action includes at least one of: turning off a radio of the vehicle, sending an alert to the driver of the vehicle, and recommending that the driver receive additional driver training.

8. The apparatus of claim 1, the operations further comprising:
   causing state data of the driver to be collected based on the determining that the actual response time is not within the response time range, and
   updating a driver profile associated with the driver based on the state data of the driver.

9. The apparatus of claim 1, wherein the plurality of sensors includes at least one of: a camera, a radar, and a lidar.

10. The apparatus of claim 1, wherein the CAN data includes at least one of: a speed of the vehicle, an extent a brake pad of the vehicle has been pressed, and an extent a steering wheel of the vehicle has turned.

11. A computer-implemented method comprising:
    receiving, by a computing system, sensor data for a surrounding environment outside a vehicle, the sensor data collected by a plurality of sensors;
    determining, by the computing system, an action for a driver of the vehicle to perform, responsive to the surrounding environment, based on the sensor data;
    determining, by the computing system, a response time range for the driver to perform the action based on a number of obstacles in the surrounding environment, wherein the response time range for the driver to perform the action increases based on a decrease in the number of obstacles in the surrounding environment or decreases based on an increase in the number of obstacles in the surrounding environment;
    determining, by the computing system, based on control area network (CAN) data collected from the vehicle, performance of the action and an actual response time associated with the performance of the action;
    determining, by the computing system, that the actual response time is not within the response time range for the driver to perform the action; and
    causing, by the computing system, a remedial action to be performed in response to determining that the actual response time is not within the response time range for the driver to perform the action.

12. The computer-implemented method of claim 11, wherein the response time range for the driver to perform the action is based on a driver profile associated with the driver.

13. The computer-implemented method of claim 11, wherein the response time range for the driver to perform the action is based on a state of the vehicle.

14. The computer-implemented method of claim 11, wherein the action for the driver of the vehicle to perform and the response time range for the driver to perform the action are based on a scenario indicated by the sensor data.

15. The computer-implemented method of claim 11, wherein the action for the driver of the vehicle to perform includes at least one of: decelerate the vehicle, accelerate the vehicle, turning the vehicle, turning off a radio of the vehicle, closing a window of the vehicle, turning on headlights of the vehicle, and turning on windshield wipers of the vehicle.

16. A non-transitory computer-readable storage medium including instructions that, when executed by a computing system, cause the computing system to perform operations comprising:
- receiving sensor data for a surrounding environment outside a vehicle, the sensor data collected by a plurality of sensors;
- determining an action for a driver of the vehicle to perform, responsive to the surrounding environment, based on the sensor data;
- determining a response time range for the driver to perform the action based on a number of obstacles in the surrounding environment, wherein the response time range for the driver to perform the action increases based on a decrease in the number of obstacles in the surrounding environment or decreases based on an increase in the number of obstacles in the surrounding environment;
- determining based on control area network (CAN) data collected from the vehicle, performance of the action and an actual response time associated with the performance of the action;
- determining that the actual response time is not within the response time range for the driver to perform the action; and
- causing a remedial action to be performed in response to determining that the actual response time is not within the response time range for the driver to perform the action.

17. The non-transitory computer-readable storage medium of claim 16, wherein the response time range for the driver to perform the action is based on a driver profile associated with the driver.

18. The non-transitory computer-readable storage medium of claim 16, wherein the response time range for the driver to perform the action is based on a state of the vehicle.

19. The non-transitory computer-readable storage medium of claim 16, wherein the action for the driver of the vehicle to perform and the response time range for the driver to perform the action are based on a scenario indicated by the sensor data.

20. The non-transitory computer-readable storage medium of claim 16, wherein the action for the driver of the vehicle to perform includes at least one of: decelerate the vehicle, accelerate the vehicle, turning the vehicle, turning off a radio of the vehicle, closing a window of the vehicle, turning on headlights of the vehicle, and turning on windshield wipers of the vehicle.

* * * * *